US010292005B2

(12) United States Patent
Jordan

(10) Patent No.: US 10,292,005 B2
(45) Date of Patent: *May 14, 2019

(54) OBJECT LOCATION TRACKING USING MOBILE COMMUNICATION DEVICE

(71) Applicant: Twych Innovation, Inc., Canoga Park, CA (US)

(72) Inventor: Dan Jordan, Woodland Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/676,455

(22) Filed: Aug. 14, 2017

(65) Prior Publication Data

US 2018/0014152 A1    Jan. 11, 2018

Related U.S. Application Data

(63) Continuation of application No. 14/593,893, filed on Jan. 9, 2015, now Pat. No. 9,736,628.

(51) Int. Cl.
*H04W 4/02* (2018.01)
*H04W 4/80* (2018.01)

(52) U.S. Cl.
CPC ............... *H04W 4/02* (2013.01); *H04W 4/80* (2018.02)

(58) Field of Classification Search
CPC ........................................................ H04W 4/02
USPC ...................................................... 455/456.1
See application file for complete search history.

(56) References Cited

U.S. PATENT DOCUMENTS

| 8,570,373 | B2 * | 10/2013 | Variyath | G01S 5/02 348/143 |
| 9,652,778 | B1 | 5/2017 | Kato | |
| 9,736,628 | B2 | 8/2017 | Jordan | |
| 9,826,356 | B2 * | 11/2017 | Mycek | H04W 4/021 |
| 2003/0146835 | A1 * | 8/2003 | Carter | G01S 5/0036 340/539.13 |
| 2004/0108954 | A1 * | 6/2004 | Richley | G01S 5/0226 342/387 |
| 2007/0018820 | A1 * | 1/2007 | Chand | G01C 21/206 340/572.1 |

(Continued)

OTHER PUBLICATIONS

NFC Forum, Inc. 2010, NFC Digital Protocol: Technical Specification, Digital 1.0, NFCForum-TS-DigitalProtocol-1.0, dated Nov. 17, 2010, FC Forum, Inc., Wakefield, MA, 94 pages.

(Continued)

*Primary Examiner* — Santiago Garcia

(57) ABSTRACT

An object location tracking system may include an object, a mobile communication device, and a data storage system. The object may include a wireless short range communication system that wirelessly transmits object identification information over a short range that uniquely identifies the object. The mobile communication device may have a location detection system that generates location information indicative of the location of the wireless communication device; a wireless short range communication system that wirelessly receives the object identification information from the object when the object is in close proximity to the mobile communication device; and a wireless data communication system that wirelessly communicates the location information and the object identification information to a data storage system. The data storage system may receive and store the location information and the object identification from the wireless data communication system in the mobile communication device.

21 Claims, 2 Drawing Sheets

(56) References Cited

U.S. PATENT DOCUMENTS

| | | | | |
|---|---|---|---|---|
| 2008/0125965 | A1* | 5/2008 | Carani | G07C 5/008 701/408 |
| 2009/0002163 | A1* | 1/2009 | Farrington | G06K 7/0008 340/572.1 |
| 2009/0112460 | A1* | 4/2009 | Baker | G06Q 20/102 701/532 |
| 2009/0132441 | A1* | 5/2009 | Muller | H04N 7/163 706/11 |
| 2009/0174548 | A1* | 7/2009 | Chan | G08B 21/0202 340/539.13 |
| 2009/0315717 | A1* | 12/2009 | Soomro | G06K 7/0008 340/572.1 |
| 2011/0037712 | A1* | 2/2011 | Kim | H04M 1/7253 345/173 |
| 2011/0217962 | A1* | 9/2011 | Leung | G01S 13/003 455/414.2 |
| 2012/0064920 | A1* | 3/2012 | Shaw | H04W 4/02 455/456.4 |
| 2012/0190386 | A1* | 7/2012 | Anderson | G01C 15/04 455/456.3 |
| 2013/0041648 | A1* | 2/2013 | Osman | H04S 7/304 704/2 |
| 2013/0249864 | A1* | 9/2013 | Wu | G06F 3/0418 345/175 |
| 2013/0260348 | A1* | 10/2013 | Blow | H04W 4/023 434/236 |
| 2013/0262559 | A1* | 10/2013 | Neerings | G06Q 30/02 709/203 |
| 2014/0129392 | A1* | 5/2014 | Hanayama | G06Q 30/0635 705/26.81 |
| 2014/0148120 | A1* | 5/2014 | Buck | H04W 4/22 455/404.2 |
| 2014/0152852 | A1* | 6/2014 | Ito | H04N 1/00137 348/207.1 |
| 2014/0173439 | A1* | 6/2014 | Gutierrez | G08B 21/24 715/727 |
| 2014/0229246 | A1* | 8/2014 | Ghaffari | G06K 19/0723 705/13 |
| 2014/0274031 | A1* | 9/2014 | Menendez | H04W 52/0209 455/426.1 |
| 2015/0066557 | A1* | 3/2015 | Lichti | H04W 4/028 705/7.15 |
| 2015/0102940 | A1* | 4/2015 | Keech | H04Q 9/00 340/870.02 |
| 2015/0113271 | A1* | 4/2015 | Jooste | H04L 63/08 713/168 |
| 2015/0123794 | A1* | 5/2015 | Hamalainen | G07C 9/00111 340/539.13 |
| 2015/0134145 | A1* | 5/2015 | Lee | A61B 19/5244 701/2 |
| 2015/0156747 | A1* | 6/2015 | Skaaksrud | H04W 12/06 455/456.1 |
| 2015/0220989 | A1* | 8/2015 | Hayes | G06Q 30/0261 705/14.35 |
| 2016/0029158 | A1* | 1/2016 | Hansen | G07C 1/24 455/456.1 |
| 2016/0110984 | A1* | 4/2016 | Seol | H04W 4/008 340/539.13 |
| 2016/0338000 | A1* | 11/2016 | Halla | H04W 4/02 |
| 2017/0235981 | A1* | 8/2017 | Hansen | G06K 7/10415 340/8.1 |
| 2017/0270217 | A1 | 9/2017 | Rosati | |

OTHER PUBLICATIONS

W3C 2008. Geolocation API Specification, W3C Working Draft Dec. 22, 2008. (Downloaded from http://www.w3.org/TR/2008/WD-geolocation-API-20081222/).

NFC Forum, Inc. 2010, NFC Digital Protot.—ol: Technical Specification; Dig1ta! 1.0, NFCForum-TS-DigitalPmtocol-1.0, dated Nov. 17, 2010, FC Forum. Inc., Wakefield, MA 94 pages.

W3C 2009. Geolocation AP! Specification, W3C Working Draft Dec. 22, 2008. (Downloaded from http:/iW\"\o'W.\V3. org/TR/2008/WD-geolocation-AP!-20081222!).

\* cited by examiner

OBJECT LOCATION TRACKING USING MOBILE COMMUNICATION DEVICE

BACKGROUND

Technical Field

This disclosure relates to tracking the location of objects, such as promotional objects.

Description of Related Art

There are many situations in which it may be desirable to track the location of an object, such as the location of a promotional object, such as a mug, pen, portfolio (e.g., day timer or calendar), stress ball, coaster, cup holder, T-shirt, or soda can.

Tracking that location, however, can be difficult, costly, or impractical. For example, expensive and/or bulky hardware may be needed. The cooperation of a person carrying that object may also be needed, which may not be provided or at least provided regularly.

SUMMARY

An object location tracking system may include an object, a mobile communication device, and a data storage system. The object may include a wireless short range communication system that wirelessly transmits object identification information over a short range that uniquely identifies the object. The mobile communication device may have a location detection system that generates location information indicative of the location of the wireless communication device; a wireless short range communication system that wirelessly receives the object identification information from the object when the object is in close proximity to the mobile communication device; and a wireless data communication system that wirelessly communicates the location information and the object identification information to a data storage system. The data storage system may receive and store the location information and the object identification from the wireless data communication system in the mobile communication device.

The wireless short range communication system included with the device may include an NFC tag. The wireless short range communication system included with the mobile communication device may include an NFC initiator.

The data storage system may have a network address. The NFC tag that is included with the object may wirelessly transmit a URL that includes the network address of the data storage system and the object identification information when in close proximity to the mobile communication device.

The wireless data communication system in the mobile communication device may wirelessly send a communication to the data storage system using the URL; in response, wirelessly receive from the data storage system a request for the location information; and wirelessly deliver the location information to the data storage system in response to the request for the location information. The data storage system may deliver the request for the location information to the mobile communication device in response to receipt of the communication from the mobile communication device.

The data storage system may store the approximate time it receives the location information.

In response to receipt of the location information, the data storage system may deliver promotional information to the mobile communication device that is keyed to the location information that it receives from the mobile communication device.

The object may be a promotional object.

The object may include a location-tracking indicator that visually indicates that the object includes a location tracking device.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
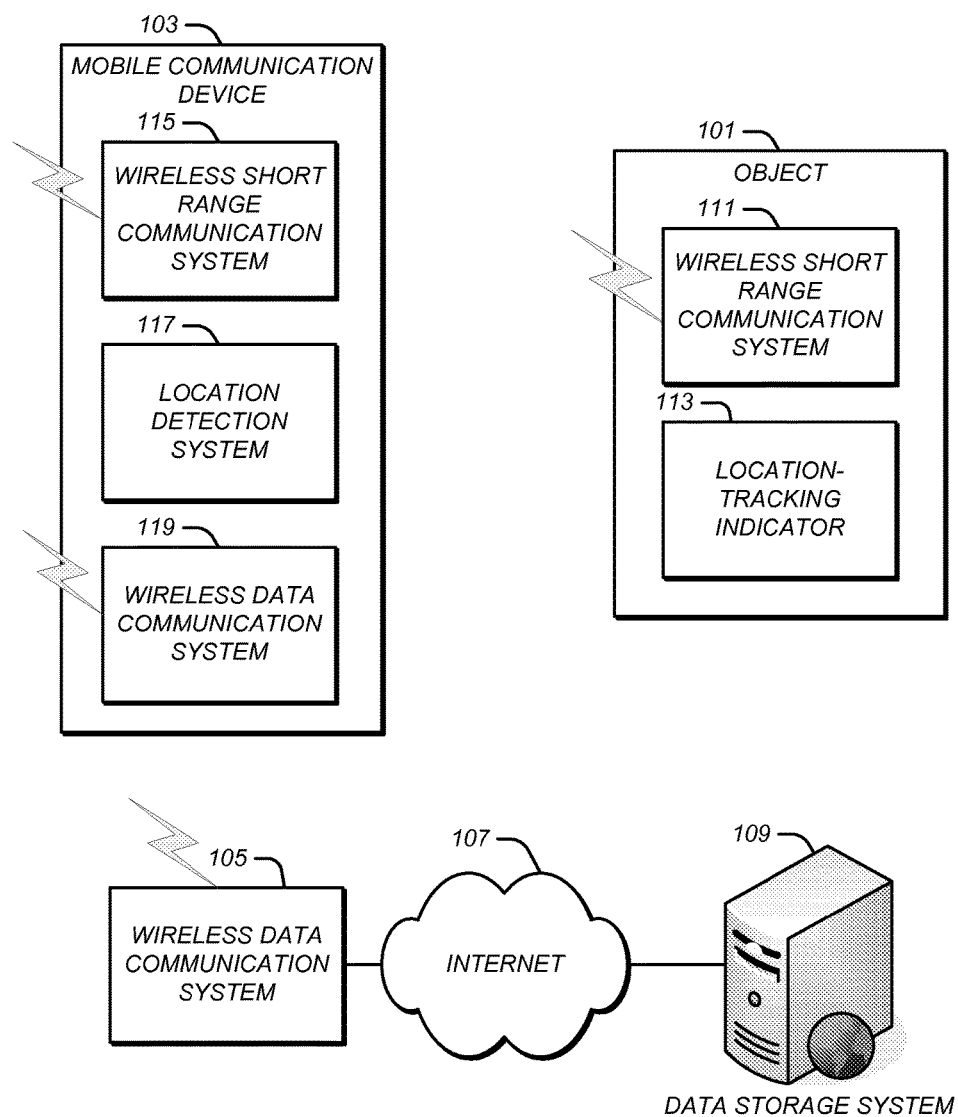
FIG. 1 illustrates an example of an object location tracking system.
Figure 2:
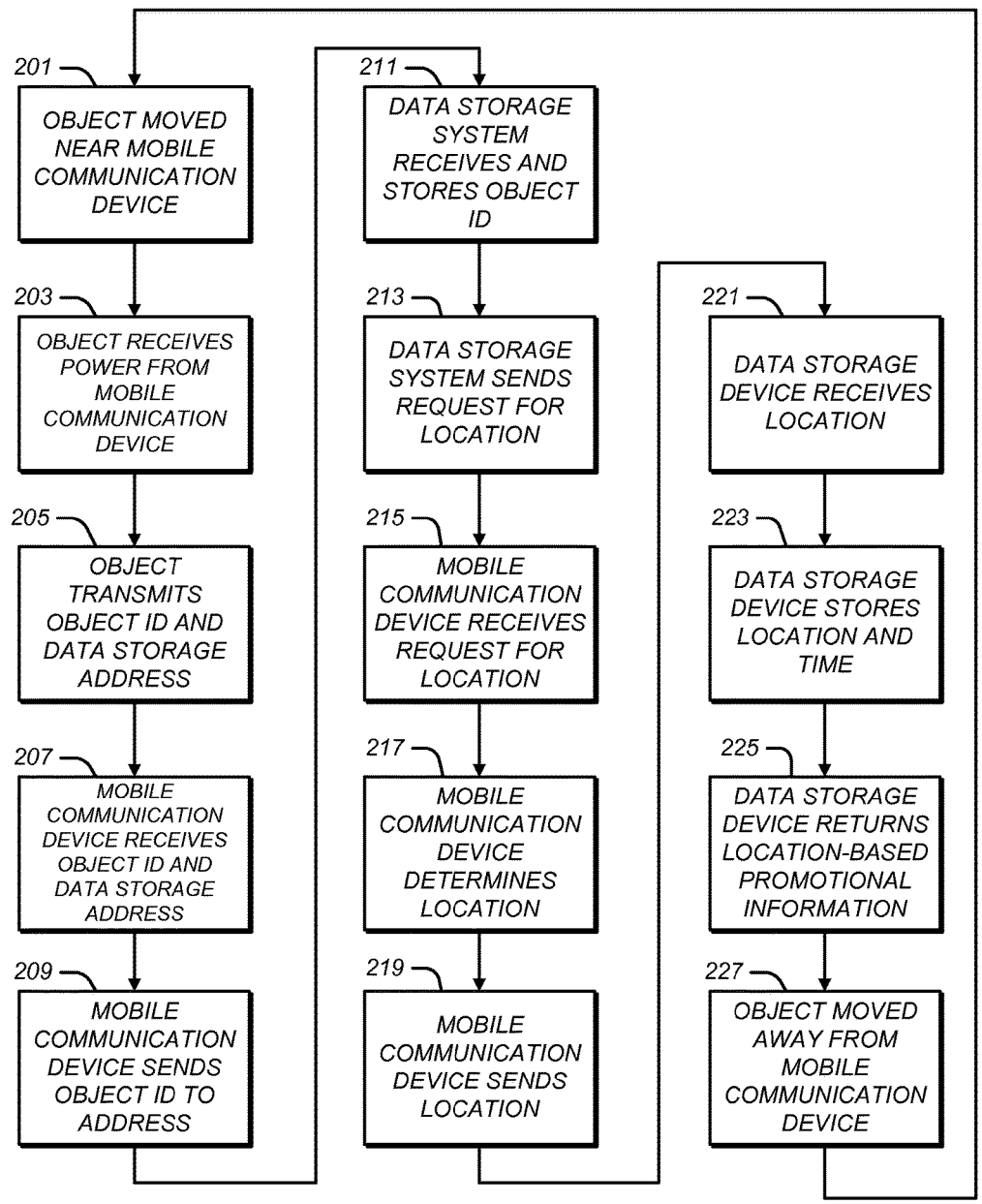
FIG. 2 illustrates an example of an object location tracking process.

FIG. 1 illustrates an example of an object location tracking system. FIG. 2 illustrates an example of an object location tracking process.

As illustrated in FIG. 1, the object location tracking system may include an object 101 whose location is to be tracked, a mobile communication device 103, a wireless data communication system 105, the Internet 107, and a data storage system 109.

The object 101 may be of any type. For example, the object 101 may be a promotional object that was given as a gift, such as a mug, pen, portfolio (e.g., day timer or calendar), stress ball, coaster, cup holder, T-shirt, or soda can.

The object 101 may include a wireless short range communication system 111. The wireless short range communication system 111 may be attached to (e.g., with adhesive) or embedded within the object 101. The wireless short range communication system 111 may be configured to wirelessly transmit object identification information that uniquely identifies the object. It may be configured to do so only in response to a wireless signal from a device that is in close proximity to the object 101 and to do so each time the object 101 is brought in such close proximity.

The wireless short range communication system 111 may be of any type. For example, the wireless short range communication system 111 may be an NFC tag. The wireless short range communication system 111 may instead utilize Bluetooth, Wi-Fi, UHF, an RFID, and/or any other type of short range wireless communication.

The wireless short range communication system 111 may be configured to wirelessly transmit a string in response to the wireless signal. When the wireless short range communication system 111 is an NFC tag, for example, the NFC tag may be configured to transmit the string in response to being placed in close proximity to an NFC initiator. The wireless signal from the NFC initiator may be received by the NFC tag and processed to also provide power for the NFC tag.

The string that is transmitted may include any information. For example, the string may include the object identification information that uniquely identifies the object. The string may also include a network address of the data storage system 109 which, as explained below, will ultimately store information indicative of the location of the object.

The string may be in any form. For example, the string may be a URL that includes the network address at which the data storage system 109 resides. The URL may also include the object identification information. The following is an example of such a URL:

http://www.twych.com/object/id=12345&url=/supplierid+distid+clientid?run

The initial "http://www.twych.com/object" portion of this URL may represent the network address of the data storage system 109. The next "id=12345" portion of this URL may be the object identification information. The remainder of the URL may identify a supplier, distributor, and/or client of the object and/or any other information. The URL may be in a different form and/or order. A string other than a URL may in addition or instead be provided.

The object 101 may have a location-tracking indicator 113 that visually indicates that the object includes a location-tracking device. The location-tracking indicator may be a logo, trademark, and/or textual information. The location-tracking indicator may include instructions on how to effectuate location tracking, e.g., instructions to place the object in close proximity to a mobile communication device.

The mobile communication device 103 may be of any type. For example, it may be a wireless phone, such as a smart phone, or a vehicle that has the necessary communication components. The mobile communication device may include a wireless short range communication system 115, a location detection system 117, and/or a wireless data communication system 119.

The wireless short range communication system 115 in the mobile communication device 103 may be configured to wirelessly communicate with the wireless short range communication system 111 in the object 101. Thus, the wireless short range communication system 115 may be configured to be compatible with the wireless short range communication system 111. When the wireless short range communication system 111 is an NFC tag, for example, the wireless short range communication system 115 may be a compatible NFC initiator.

The location detection system 117 may be configured to detect the location of the mobile communication device 103 and to provide location information indicative of this location. Although not identical to the location of the object 101, it may be very close, as the wireless short range communication system 111 in the object 101 may be configured to only transmit the object identification information when it is in close proximity to the mobile communication device 103.

The location detection system 117 may be of any type. For example, it may be a GPS system or a cell phone triangulation system.

The location information may be in any form. For example, it may be the geo-coordinates of the mobile communication device 103 or only a subset of these coordinates, such as only latitude and longitude.

The wireless data communication system 119 may be configured to wirelessly communicate the location information and the object identification information to the data storage system 109.

The wireless data communication system 119 may be configured to communicate wirelessly with the data storage system 109 using any type of network and communication protocol or any combination of them. For example, the wireless data communication system 119 may be configured to communicate wirelessly with the wireless data communication system 105 over a cellular network, a data network, a Wi-Fi network, any other type of network, or any combination of networks. The wireless data communication system 105 may be configured to communicate with the data storage system 109 through the Internet 107 or any other type of network or combination of networks.

When the network over which the wireless data communication system 119 communicates is not connected to the Internet, the wireless data communication system 105 may include a bridge to the Internet.

The object 101 may be brought in close proximity to the mobile communication device 103, as reflected by an Object Moved Near Mobile Communication Device step 201. When this happens, the wireless short range communication system 111 may be energized by electromagnetic radiation from the wireless short range communication system 115 in the mobile communication device 103, as reflected by an Object Receives Power from Mobile Communication Device step 203.

In turn, this may cause the wireless short range communication system 111 to wirelessly transmit the object identification information to the mobile communication device 103, along with an address of the data storage device 109, as reflected by an Object Transmits Object ID and Data Storage Address step 205. In the case where the mobile communication device 103 utilizes an NFC initiator for the wireless short range communication system 115, this may happen without the addition of any custom application in the mobile communication device 103 by virtue of the standard NFC protocol that automatically translates a received string that begins with http://into a request and delivers it over the Internet.

The wireless short range communication system 115 in the mobile communication device 103 may then receive the object identification information and the data storage address, as reflected by a Mobile Communication Device Receives Object ID and Data Storage Address step 207. In turn, the wireless data communication system 119 may wirelessly transmit the object identification information to the store data storage system 109 at the provided network address, as reflected by a Mobile Communication Device Sends Object ID to Address step 209.

The data storage system 109 may receive the object identification information and store it, along with information identifying the mobile communication device 103, as reflected by a Data Storage System Receives and Stores Object ID step 211.

The information identifying the mobile communication device 103 may be of any type or in any form. For example, it may be the IP and port address of the mobile communication device 103.

The data storage system 109 may then send a request back to the mobile communication device 103 for the location of the mobile communication device 103, as reflected by a Data Storage System Sends Request for Location step 213. This may be received by the wireless data communication system 119 in the mobile communication device 103, as reflected by a Mobile Communication Device Receives Request for Location step 215. In turn, the mobile communication device 103 may seek the location information from the location detection system 117, as reflected by a Mobile Communication Device Determines Location step 217. The mobile communication device 103 may then return the location information to the data storage system 109 using the wireless data communication system 119, as reflected by a Mobile Communication Device Sends Location step 219.

The data storage system 109 may then receive the location information, as reflected by a Data Storage Device Receives Location step 221. The data storage system 109 may then store the received location information, along with the approximate time of its receipt, as reflected by a Data Storage Device Stores Location and Time step 223.

The data storage system 109 may be configured to deliver various kinds of information back to the mobile communication device 103, such as promotional information that is keyed to the location information that the data storage system receives from the mobile communication device 103, as reflected by a Data Storage System Returns Location-Based Promotional Information step 225. For example, the data storage system 109 may be configured to deliver promotional coupons for products or services in the vicinity of the location indicated by the location information.

The object 101 may then be moved away from the mobile communication device 103, as reflected by an Object Moved Away From Mobile Communication Device step 227.

The object 101 may then again be moved in close proximity to the mobile communication device 103, as reflected by the Object Moved Near Mobile Communication Device step 201. And the process may repeat and continue to repeat each time the object 101 is move away from and then in close proximity to the mobile communication device 103.

Sometimes, the object 101 may be moved in close proximity to a different mobile communication device, in which case the same process may take place, albeit with the different mobile communication device.

Processes with additional, not as many, or different steps may instead be implemented. For example, the mobile communication device 103 may be configured to transmit its location at the same time it transmits the object identification information to the data storage system 109. In this case, the data storage system 109 may not respond with a request for the location information.

The data storage system 109 may be configured to participate in any of the processes that have now been described in connection with numerous different objects and their associated mobile communication devices.

The data that is stored in the data communication system 119 may be used for any purpose. For example, the data may be made accessible over the Internet to suppliers, vendors, and/or distributors of the object 101, along with the data for other objects whose locations are also being tracked.

The data storage system 109 may include a data query system that enables the entity seeking access to the data to specify any desired subset and/or aggregation of the data. For example, the query system may enable an entity to determine the various locations at which one specific object has been, the various locations at which objects of the same type have been, and/or the various objects and/or types of objects that have been at specified locations and/or within specified distances of specified locations. The query system may also include filters, such as date filters, location filters, and/or object filters.

The data storage system 109 may include mapping data that may enable the data storage system 109 to determine and communicate to inquirers a likely route over which a person took a particular object, based on the various locations at which the object has been detected, as well as the time differences between each detected location.

The data storage system 109 may determine and communicate to inquirers the amount of time an object has been at one or more locations by subtracting the time the object is first detected at each location from the time the object is last detected at that location (or first detected at the next location). The data storage system 109 may determine and communicate to inquirers the cumulative amount of time an object has been at several or all detected locations by summing the duration of the object's time at each location.

The data storage system 109 may build a personal profile for the person carrying the object based on the stored times, dates and location information. This may be useful when the object is a personal object, such as a promotional toothbrush, cosmetic case, or billfold. The data storage system 109 may determine a pattern in the person's personal habits or routine based on this information (e.g., such as when and where the person brushes her teeth, puts on makeup, or uses her billfold). The data storage system 109 may provide a customized report of this personal profile.

The data storage system 1098 may build a location profile for the object based on the stored information. For example, a promotional keychain may be handed out by a restaurant. The keychain may be moved close to the person's mobile phone each time during use. The data storage system 109 may make a menu or delivery suggestion based on where the object is at this time and deliver it to the mobile phone for view by the user. That menu or delivery suggestion may be based on whether the reported time is lunch and whether the reported location is the person's place of work (which may result in a quick, single person menu), whether the reported time is dinner and the reported location is the person's home (which may result in a more complete menu for a family), or whether the reported location is far from home (which the system may know based on numerous reports on previous days of the person consistently being at a much different location). Data collected over time may allow the system to make these types of determinations. The data storage system 109 may then deliver recommendations to the person's mobile phone based on these determinations and what is seemingly appropriate for each one. This delivery may be at the same time as a reported location or at a later time.

The data storage system 109 may map movements of objects other than the one that has the wireless short range communication system. For example, USPS may distribute a fun promotional item to promote awareness about it's door step pickup and delivery service. Neighbors may be encouraged to move the item close to their mobile phones each time they see the postman in their neighborhood. The data processing system may use the resulting information to provide details about a postman's whereabouts and/or approximate times and details about when the postman is expected to arrive at different parts of his route.

The data storage system 109 may map a coming disaster or epidemic. For example, in anticipation of a flu season, a pharmaceutical company may pass out promotional thermometers to those who get a flu shot. If people in or near a recipients home falls ill, this thermometer may be used to take their temperature. In the process, the times and locations of the thermometer may be interpreted by the data storage system as defining a possible time period and area of infection. The data storage system may place the coordinates on a larger map and broadcast the pattern for others to see. This may induce others in the area or in areas to which the map seems to points (which may include times, as well as locations) to also get a flu shot.

The data string that is delivered by the wireless short range communication system that is part of the object may be placed there by any means and at any time. For example, it may be placed there before or after the object is distributed. If afterwards, instructions may be provided to the user about how to do this.

Unless otherwise indicated, the mobile communication device 103, the wireless data communication system 105, and/or the data storage system 109 may be implemented with a computer system configured to perform the functions that have been described herein for the component. Each computer system may include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system for the data storage system 109 may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the communication device that prompts the object for its unique identification information and forwards that information to the data storage system along with the location information may be a stationary communication device, which may be located in a commercial or public establishment.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A mobile communications device that includes a processor and memory, the processor executing instructions to:
   receive object identification information that uniquely identifies an object;
   communicate from a location tracking system to wirelessly communicate location information and the object identification information to a data storage system that is not part of the mobile communication device; the location information being associated with the object identification information, wherein the object identification information is usable to make additional information associated with the object available.

2. The mobile communications device of claim 1 wherein object identification information is received wirelessly via one of Bluetooth, Wi-Fi, UHF, an RFID.

3. The mobile communications device of claim 1 further comprising instructions to process a Near Field Communication (NFC) tag.

4. The mobile communications device of claim 1 wherein location information includes GPS coordinates.

5. The mobile communications device of claim 1 further comprising instructions to receive at the mobile device promotional information.

6. The mobile communications device of claim 1 wherein the additional information is made available with a change in location of the object.

7. The mobile communications device of claim 2 wherein the tag includes a URL.

8. The mobile communications device of claim 2, wherein the tag includes a URL having information about one of the object and a network address.

9. The mobile communications device of claim 1 further comprising instructions to receive timing information associated with the object.

10. A method, comprising:
    receiving by a processor of a mobile device, wirelessly transmitted URL that includes a network address of a data storage system and object identification information from a wireless short range communication system that uniquely identifies the object;
    communicating, by the processor of the mobile device, with a location tracking system to wirelessly communicate location information and the object identification information to a data storage system that is not part of the mobile communication device; the location information being associated with the object identification information, and
    receiving, by the processor of the mobile device, additional information associated with the object from the data storage system.

11. The method of claim 10, wherein the wireless short range communication system included with the object includes a Near Field Communication (NFC) tag.

12. The method of claim 10 further comprising making the additional information available with a change in location of the object.

13. The method of claim 10 wherein the tag includes a URL having information about one of the object and a network address.

14. The method of claim 10 wherein location information includes GPS coordinates.

15. The method of claim 10 further comprising receiving at the mobile device promotional information.

16. The method of claim 10 making the additional information available with a change in location of the object.

17. The method of claim 10 further comprising wherein the short range communication system communicates via one of Bluetooth, Wi-Fi, UHF, an RFID.

18. The method of claim 10 further comprising receiving by the processor of the mobile device from the data storage system one of filtered information and a location profile of one of the object and a user of the mobile device.

19. The mobile communications device of claim 1 further comprising instructions to receive by the processor of the mobile device from the data storage system one of filtered information and a location profile of one of the object and a user of the mobile device.

20. The mobile communications device of claim 1 further comprising an NFC initiator.

21. The method of claim 10 further comprising receiving by the processor of the mobile device timing information with a change in location of the object.

* * * * *